April 30, 1929.  G. L. KIER  1,711,171
SLED
Filed Dec. 10, 1927

WITNESS
F. J. Hartman.

INVENTOR
George L. Kier.
BY
Blount & Herbert
ATTORNEYS

Patented Apr. 30, 1929.

1,711,171

UNITED STATES PATENT OFFICE.

GEORGE L. KIER, OF PHILADELPHIA, PENNSYLVANIA, ASSIGNOR TO S. L. ALLEN & CO., INC., A CORPORATION OF PENNSYLVANIA.

SLED.

Application filed December 10, 1927. Serial No. 239,101.

My invention relates to sleds of the type which are steered by bending the runners laterally; for this purpose such sleds have hitherto been provided with a steering bar extending transversely of the sled and adapted to be moved by the hands or feet to effect the desired flexing of the runners in either direction.

A principal object of the present invention is to provide a sled having laterally bendable runners but which is devoid of the steering bar to which reference has been made and in which the steering is effected by a longitudinal or fore and aft movement of slidable hand grips so disposed and arranged as to be readily grasped by a person lying upon the sled, as distinguished from sitting thereon, and which are capable of being very easily manipulated by a person in that position so as to enable the sled to be steered with a minimum of effort.

Such sleds being devoid of the usual steering bar with its projecting ends designed to provide foot rests or hand holds are of less overall width than an ordinary steering sled having the same width of tread between the runners, and consequently can be passed through narrower openings than ordinary sleds of similar size and width of tread and require less space in packing and shipping while additionally, they present an attractive and "racy" appearance with consequent appeal to a certain class of customers and more particularly those desiring a fast sled.

Further objects of the invention are to generally improve and simplify in certain respects the design and construction of steering sleds; to provide a sled which is strong, not likely to get out of order or be damaged in use, and to provide a sled embodying certain novel features and improvements yet which may be manufactured at a cost to permit it to compete with the steering sleds now on the market and in commercial demand. Still further objects and novel features of design, construction and arrangement comprehended by my invention are hereinafter more fully disclosed or will be apparent from the following description of a sled constructed in accordance with one embodiment of my invention as illustrated in the accompanying drawing.

Figure 1:
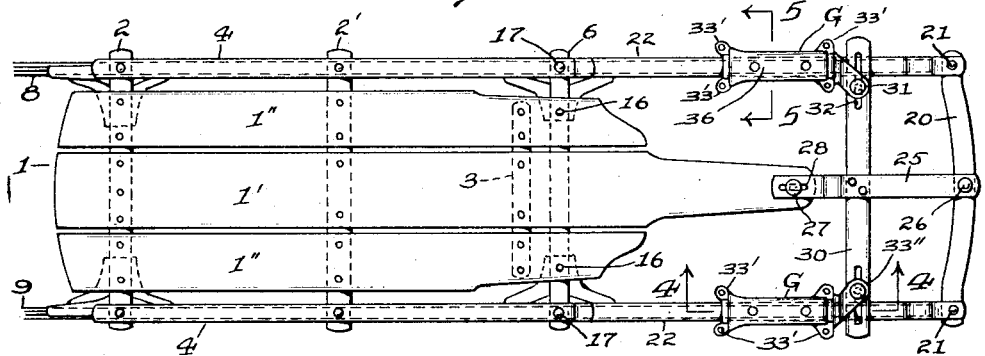
Figure 2:
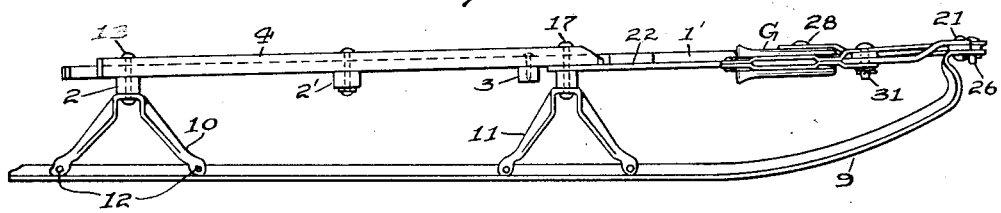
Figure 3:
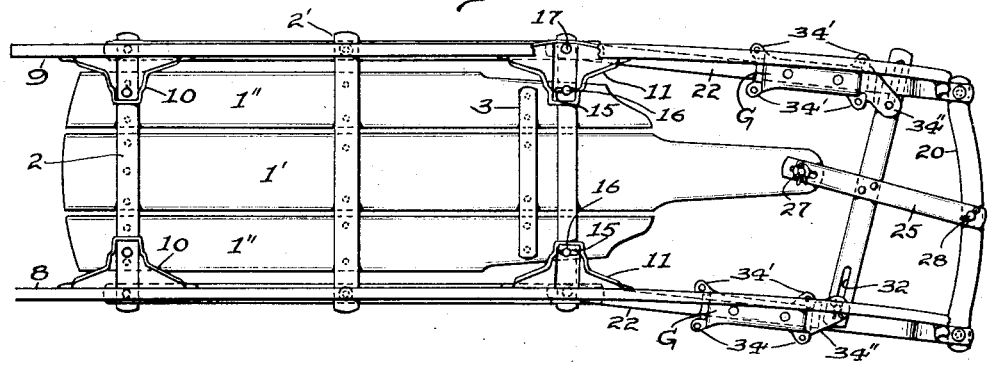
Figure 4:
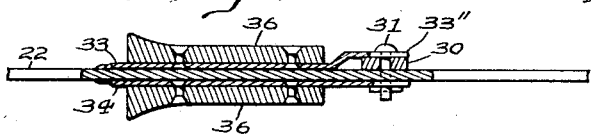
Figure 5:
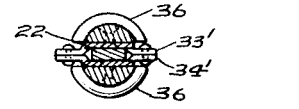

In the said drawing Fig. 1 is a top plan view of the sled with the runners in normal or unflexed position and Fig. 2 is a side elevation thereof. Fig. 3 is a bottom plan view of the sled shown in the preceding figures but with the runners flexed; Fig. 4 is a fragmentary enlarged vertical section on line 4—4 in Fig. 1 and Fig. 5 is a similarly enlarged transverse section on line 5—5 in said figure. Like numerals are used to designate the same parts in the several figures.

As shown, the sled comprises a top or deck generally designated as 1 formed of a longitudinally extending center strip or slat 1' and outer strips 1" disposed on either side thereof, the center strip being considerably longer than the side strips and extending forwardly beyond the forward ends of the latter. The strips are held together by transversely extending benches 2, 2' and a cleat 3 to which the strips are nailed or otherwise suitably secured. The benches 2, 2' respectively disposed near the rear end of the deck and at about the middle thereof are of sufficient length to extend beyond the side edges of the deck to form supports for the side rails 4, 4 which extend parallel to the deck and are rigidly secured to the benches. The cleat 3 is desirably made somewhat shorter than the benches and only serves to tie the slats together adjacent their forward ends. Vertical support is, however, afforded to the forward end of the deck by another bench 6 extending transversely of the sled beneath the deck but unsecured thereto, the deck merely resting on this bench and the parts being thus relatively slidable.

For holding the deck in properly spaced relation to the runners 8, 9 and connecting the parts together, supports 10, 11 are employed; while these supports may be of any suitable character I ordinarily prefer to use supports formed from sheet metal substantially like those disclosed in Patent No. 1,066,173 granted to Samuel L. Allen, July 1, 1913, and which comprise downwardly diverging legs and a flat top portion which forms a suitable seat for the superjacent bench. When using supports of this character, one pair of the supports may be disposed beneath the rear bench 2 and riveted or otherwise secured to the runners as by rivets 12 and also to the bench as by bolts 13 while another pair of supports 11 may be similarly disposed beneath the bench 6. However, as it is desirable that these supports be capable of a small oscillatory movement with respect to the bench I prefer to arrange for the same by providing the flat top portions of the supports 11 with slots 15 for the passage of the innermost of the pair of rivets or bolts 16, 17 by which each of the supports 11 is secured to the cross bench 6, as most clearly shown in Fig. 3. Thus, when the runners are flexed as hereinafter described the outermost bolts 17 act as pivots about which the supports are free to turn through a limited arc.

The side rails 4, 4 are preferably terminated a little in advance of the cross bench 6 and held thereto by the bolts 17 while the runners are connected together at their forward upturned extremities by a cross link 20 preferably formed of flat steel and secured to the ends of the runners by rivets or bolts forming pivots 21, thus tying the extremities of the runners firmly together. Extended between each of the pivots 21 and the bolt 17 on the same side of the sled is a side bar 22 also preferably formed of flat steel; each of these bars is in substantial alignment with the subjacent runner and is of course relatively movable with respect to both the cross link 20 and the bench 6 by reason of its pivotal connection thereto. Preferably the rear end of each side bar is disposed between the upper face of the bench 6 and the adjacent side rail as best shown in Fig. 2.

The forward end of the middle deck slat 1' is connected to the cross link 20 by a steering bar 25 pivoted at its forward end to the center of the cross link by means of a pivot stud 26 and similarly pivoted adjacent its rear end to the forward end of the slat by a pivot stud 27 or other suitable means, and since a certain amount of relative longitudinal movement between the steering bar and the slat is required, the bar is provided with a slot 28 for the passage of the pivot stud 27 which is relatively stationary with respect to the slat. The steering bar may either comprise a single piece of flat steel or, preferably and as shown, be formed of two pieces disposed one above the other so as to receive between them both the cross link 20 and the forward end of the deck slat as well as a transversely extending cross bar 30 which is riveted or otherwise firmly secured to the steering bar and overlies at its ends the side bars 22. On each of the latter is slidably mounted a hand grip generally designated as G which at its forward end is connected to the cross bar 30 by means of a stud or bolt 31 extending through a slot 32 formed in the cross bar.

While the grips may be of any suitable construction I prefer to employ grips of substantially the type shown and each of which comprises a pair of steel plates 33, 34 respectively disposed above and below the side bar. The upper plate 33 is provided at its corners with outwardly extending ears 33' and at its forward end with another ear 33" through which the pivot bolt 31 is arranged to extend, and to enable this bolt to clear the adjacent side bar 22 the ear 33" is inwardly inclined or offset sufficiently to bring the hole which is formed in the ear for the passage of the bolt inside the inner edge of the side bar. In like manner the other or lower plate 34 is provided with outwardly directed ears 34' at its corners and an inwardly and forwardly inclined ear 34" for the passage of the pivot bolt 31, both plates of each grip being thus of similar construction and complementary to each other. To the outer face of each of the plates between the corner ears is riveted or otherwise permanently secured a substantially semi-cylindrical filler piece 36 of wood or other suitable material so that when the parts are assembled a substantially cylindrical grip is formed of such size that it will lie comfortably in the hand; desirably the rear ends of the pieces 36 are flared outwardly as best shown in Fig. 4 so as to increase the security of the operator's hold thereon. The ears 33', 34' are respectively oppositely offset from the plates 33 and 34 so that when the two parts of the grip are brought together and the ears 33', 34' permanently riveted to each other a longitudinally extending channel will be formed within the grip for the reception of the side bar, this channel being slightly greater in cross section than the bar so the grip can freely slide upon the latter. In order to accommodate both the side bar and end of the cross arm 30 between the pivot holding ears of the two parts of the grip, the ears 33" may be desirably upwardly offset as best shown in Fig. 4.

It is believed it will be readily apparent from an inspection of the drawings in the light of the foregoing description that a sled constructed substantially as described may be steered in either direction as desired by moving the grips G in opposite directions along the side bars, simultaneously pulling on one and pushing on the other so as to move the the steering arm 25 in either direction about the pivot 27 with resulting flexure or bending of the runners to the right or left, the side bars 22 during this movement turning about the pivots 17 and the supports 11 also slightly turning about them. It will be further apparent that the extent to which the runners may be bent to one side or the other will ordinarily be determined by the length of the slots 32 as engagement of either of the pivots 31 with either end of the slots in which it slides is effective to prevent further angular displacement of the cross bar 30. Consequently by making the slots of suitable length it is possible to prevent the runners from being bent beyond their elastic limit which might result in their being given a permanent set or even in their breakage. It will of course be understood that as the runners are formed of suitable resilient or flexible material such as tempered or spring steel they always tend to return to normal position as soon as the grips are released, thereby bringing the latter together with the parts with which they are interconnected to normal position as shown in Fig. 1 in which the steering arm extends substantially parallel to the runners and the cross arm 30 at right angles thereto.

While I have herein illustrated and described with considerable particularity a sled constructed in accordance with a preferred embodiment of my invention, I do not thereby desire or intend to limit myself to any specific features of design, construction or arrangement of the various parts as changes and modifications may be made therein if desired without departing from the spirit and scope of the invention as defined in the appended claims.

Having thus described my invention, I claim and desire to protect by Letters Patent of the United States:

1. A steering sled having laterally bendable runners, a cross link connecting the front ends of the runners, a side bar disposed adjacent each runner and extending rearwardly from the front end thereof, and means for bending the runners including a hand grip longitudinally slidable on each side bar.

2. A steering sled having laterally bendable runners, a deck, a cross link connecting the front ends of the runners, a side bar disposed adjacent each runner and extending rearwardly from the front end thereof, and means for bending the runners comprising a hand grip slidable on each side bar, a steering bar connected between the deck and said cross link and a cross bar secured to said steering bar and interconnected with the hand grips.

3. A steering sled having laterally bendable runners, a deck disposed therebetween, supports carried by the runners, cross benches carried by said supports and affording vertical support to the deck, a side bar extending adjacent each runner and pivotally connected to the forward end thereof, a cross link extending between the front ends of the runners, and means for bending the runners comprising a hand grip slidably disposed on each side bar, a steering arm pivotally connected at its ends to the cross link and to the deck, a cross bar secured to the steering bar and means forming a connection between each hand grip and the adjacent end of the cross bar.

4. A steering sled having laterally bendable runners, a deck disposed therebetween, supports carried by the runners, cross benches carried by said supports and affording vertical support to the deck, a side bar extending adjacent each runner and pivotally connected to the forward end thereof, a cross link extending between the front ends of the runners, and means for bending the runners comprising a hand grip slidably disposed on each side bar, a steering arm pivotally connected at its ends to the cross link and to the deck, a cross bar secured to the steering bar and a pin and slot connection between each hand grip and the adjacent end of the cross bar.

5. A steering sled having laterally bendable runners, a deck disposed between the runners, supports carried by the runners, cross benches seated on the supports and affording vertical support to the deck, a side bar extending adjacent each runner and pivotally connected at its rear end to one of said benches and at its forward end to the runner, a cross link extending between the front ends of the runners and pivoted thereto, and means for bending the runners comprising a hand grip longitudinally slidable on each side bar, a steering arm pivoted at its front end to the cross link and at its rear end to the deck, a cross bar carried by the steering bar, extending in opposite directions therefrom to a point adjacent each side bar and provided with slots adjacent its extremities and means connecting each grip with the adjacent end of the cross bar and including a pin carried by the grip and extending through the slot in the bar.

In witness whereof, I have hereunto set my hand this 8th day of December, 1927.

GEORGE L. KIER.